United States Patent [19]
Akita et al.

[11] 4,328,706
[45] May 11, 1982

[54] TACHOMETER SUITABLE FOR USE IN ENGINE MAINTENANCE

[75] Inventors: Sigeyuki Akita, Okazaki; Junji Kitagawa, Aichi, both of Japan

[73] Assignee: Nippon Soken, Inc., Nishio, Japan

[21] Appl. No.: 149,698

[22] Filed: May 14, 1980

[30] Foreign Application Priority Data

Jul. 27, 1979 [JP] Japan ................................. 54-96360

[51] Int. Cl.³ ............................................. G01P 3/26
[52] U.S. Cl. ...................................... 73/493; 73/506; 73/521
[58] Field of Search ................. 73/493, 506, 518, 521

[56] References Cited

U.S. PATENT DOCUMENTS

| | | | |
|---|---|---|---|
| 3,059,480 | 10/1962 | Carpenter | 73/506 |
| 3,195,525 | 7/1965 | Beck | 73/506 X |
| 3,704,445 | 11/1972 | Lanham | 73/518 X |
| 3,754,471 | 8/1973 | Hohenberg | 73/506 |

*Primary Examiner*—James J. Gill
*Attorney, Agent, or Firm*—Cushman, Darby & Cushman

[57] ABSTRACT

Pressure changes in the engine case of an automobile are sensed to compute and display the engine rpm irrespective of the types of engines. A pressure sensing element is mounted on the oil filler port in the engine cylinder head cover by means of a mounting member made of an elastic material.

8 Claims, 8 Drawing Figures

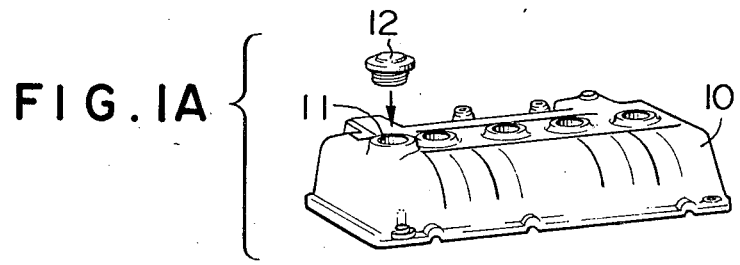
FIG.1A
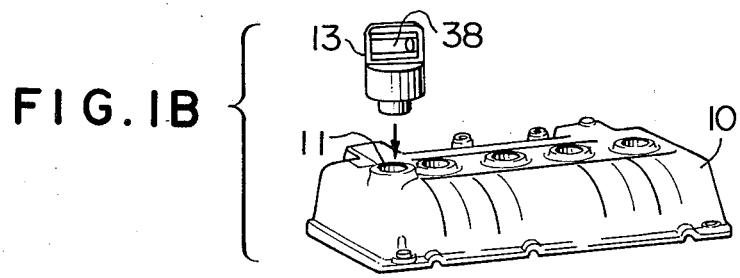
FIG.1B
FIG. 2
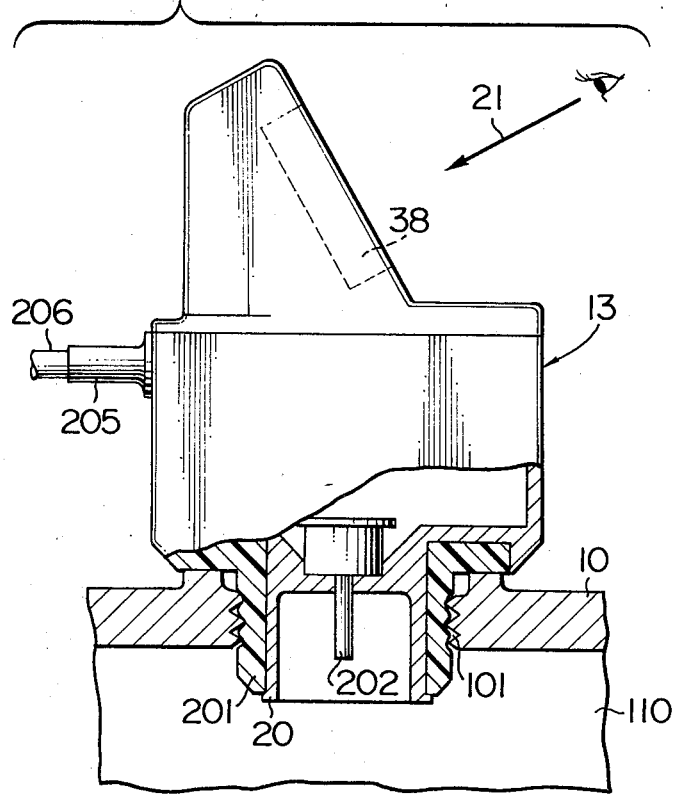

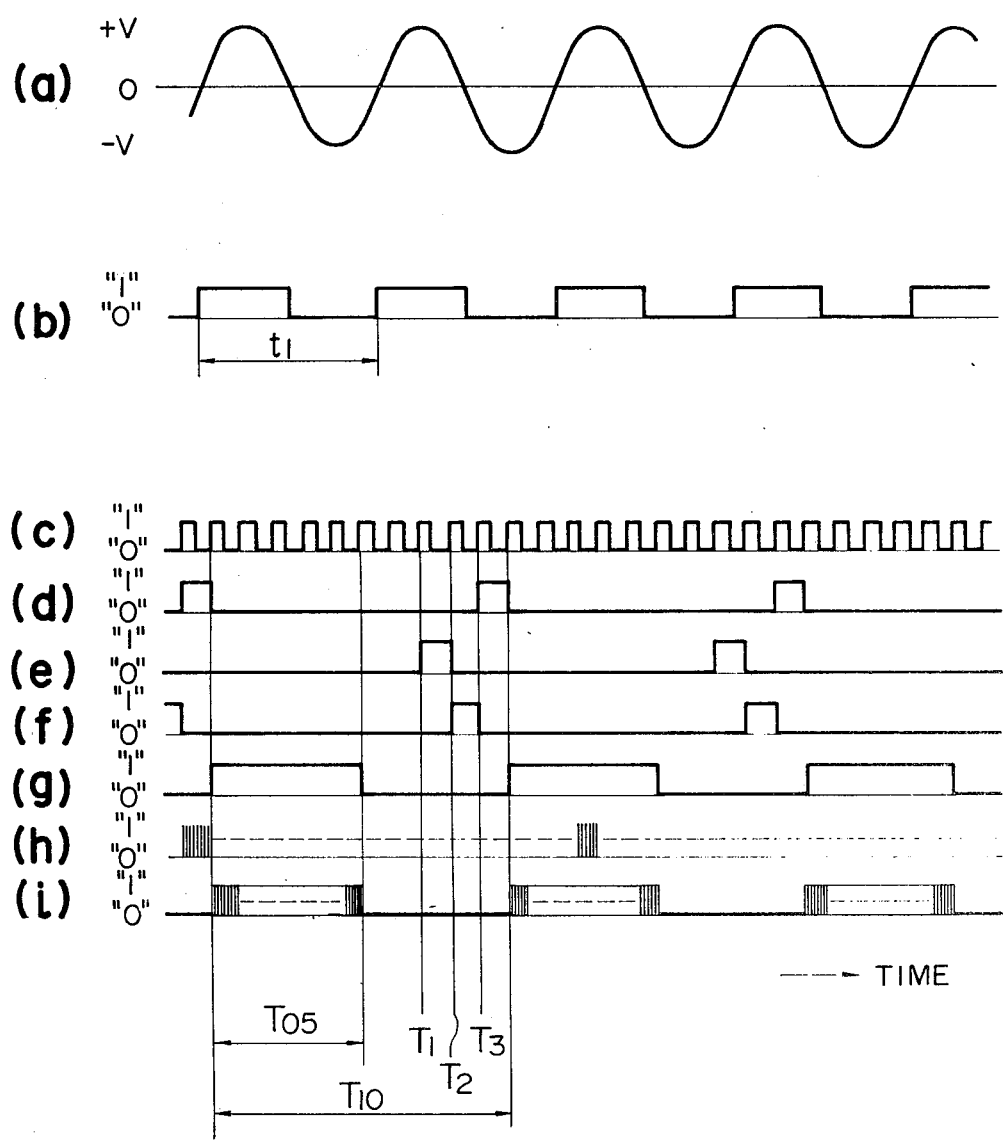

TACHOMETER SUITABLE FOR USE IN ENGINE MAINTENANCE

BACKGROUND OF THE INVENTION

The present invention relates to engine tachometers, and more particularly to a tachometer which is designed to measure the speed in revolutions per minute of a Diesel engine during the period of idle adjustment.

A known type of idle adjusting tachometer is designed so that as will be the case with gasoline engine tachometers, the primary or secondary voltage of the ignition coil is detected and the engine rpm is measured from the detection signal. However, and this prior art device has the disadvantage of being not suitable for use in vehicles equipped with Diesel engines.

SUMMARY OF THE INVENTION

It is the object of the present invention to provide a tachometer suitable for engine adjusting purposes, which is adapted for installation on all types of engines including Diesel engines and gasoline engines whereby the engine rpm can be seen directly at the location of the tachometer and thus the driver can adjust the engine idling rpm while observing the display on the tachometer.

The tachometer according to the present invention features the tachometer proper for sensing pressure changes in the engine case so as to compute and display the engine rpm. The tachometer is mounted on the oil filler port in the engine cylinder head cover (the place where the oil filler cap is fitted).

BRIEF DESCRIPTION OF THE DRAWINGS

FIGS. 1A and 1B are perspective views showing the mounting position of a tachometer according to the present invention.

FIG. 2 is a partially sectional perspective view showing the manner in which the tachometer of this invention is mounted on the oil filler port in the cylinder head cover of an engine.

FIG. 7 shows waveform diagrams useful in explaining the operation of the tachometer of the invention.

DESCRIPTION OF THE PREFERRED EMBODIMENT

Figure 3:
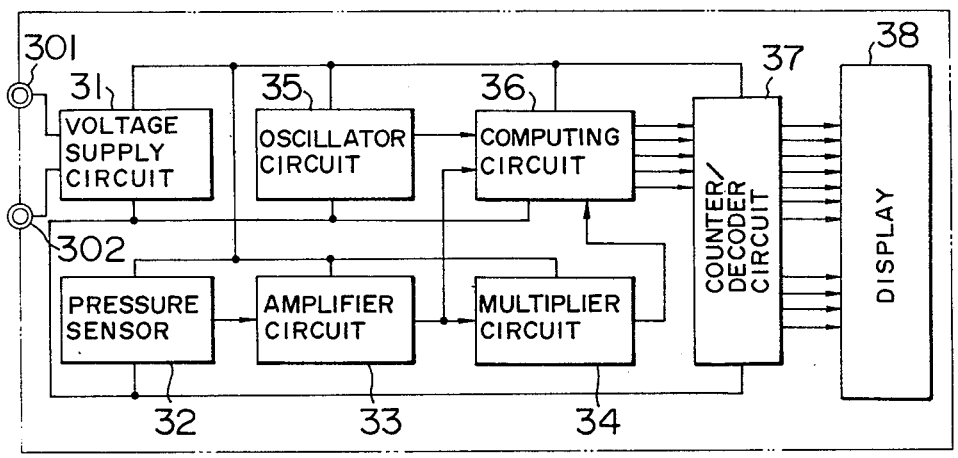
FIG. 3 is a block diagram showing an embodiment of the tachometer according to the invention.

The present invention will now be described in greater detail with reference to the illustrated embodiment.

Referring first to FIGS. 1A and 1B, numeral 10 shows an exemplary form of a cylinder head cover of an engine which is in the upper portion of the engine, 11 an oil filler port through which the engine oil is introduced, 12 an oil filler cap which covers the oil filler port to hermetically seal the engine case, and 13 a schematic construction of the device proper of a tachometer, which is fixedly mounted by forcing it into the oil filler port so as to measure the engine rpm.

FIG. 2 shows the manner in which the device proper 13 is mounted on the oil filler port 11, and the cylinder head cover 10 is formed with a threaded groove 101 for mounting the oil filler cap 12. Numeral 110 shows an engine case interior, 20 a housing forming the outer shell of the device proper 13, 201 an elastic member made of rubber or the like for hermetically sealing the engine case and fixedly mounting the device proper 13 on the engine, and 202 a pressure inlet pipe for sensing pressure changes in the engine case whereby the output signal of a pressure sensor is supplied to an engine rpm signal computing circuit (not shown) which is incorporated within the housing 20. The engine rpm is indicated by a display unit 38 so as to be visible outwardly. Numeral 21 shows the direction from which the engine rpm display will be seen. Numeral 205 designates a lead wire protective member made of rubber, and 206 a lead wire.

FIG. 3 is a block diagram showing the overall circuit construction of the tachometer according to the invention. In the Figure, numeral 31 designates a voltage supply circuit having terminals 301 and 302 which are connected to a vehicle-mounted battery. In connecting the terminals 301 and 302, they have no directional properties such as positive and negative properties and thus they may each be connected to the positive or negative terminal of the battery to permit operation of electric circuits and also to produce a constant supply voltage for supplying the circuits. Numeral 32 designates a pressure sensor for sensing pressure changes in the engine case, 33 an amplifier circuit, 34 a multiplier circuit for multiplying the output of the amplifier circuit 34 for the computational purposes which will be described later, 35 a constant-frequency oscillator circuit, 36 a computing circuit for producing a periodic signal having a predetermined time width and generating a multiplication signal only during the time width, and 37 a counter/decoder circuit responsive to the output signal of the computing circuit to generate a signal for actuating the digital-type display unit 38.

Figure 4:
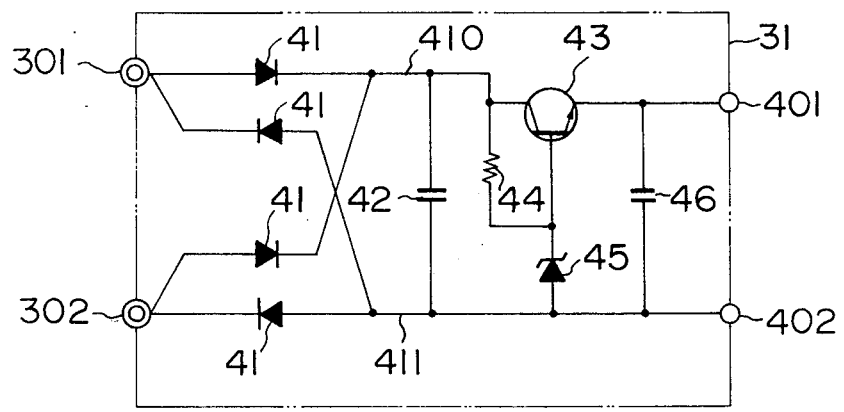
FIG. 4 is a wiring diagram showing one form of the voltage supply circuit shown in FIG. 4.

With the construction described above, the operation of the tachometer according to the invention will now be described with reference to FIGS. 4 to 7. Referring first to FIG. 4 showing a wiring diagram of the voltage supply circuit 31, the terminals 301 and 302 are each connected to the positive or negative terminal of the battery. The terminals 301 and 302 are connected to a rectifier circuit comprising four diodes 41 so that a line 410 always has a positive potential and a line 411 always has a negative potential irrespective of whether the polarities of the supply voltage to the terminals 301 and 302 are respectively positive and negative or vice versa. As a result, a constant voltage is produced from this voltage by means of a transistor 43, a resistor 44 and a Zener diode 45. This constant voltage is delivered through terminals 401 and 402 to supply power to the electric circuits which will be described later.

Figure 5:
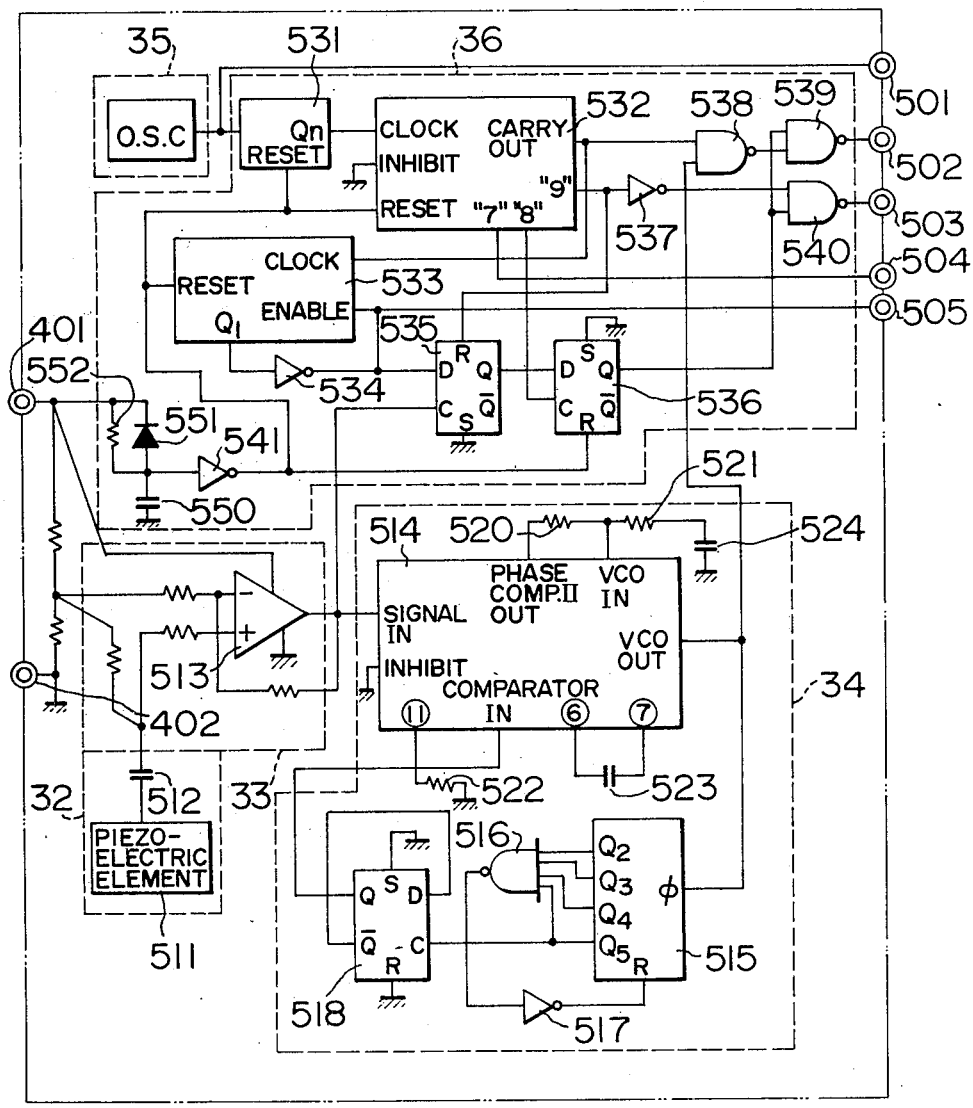
FIGS. 5 and 6 are wiring diagrams showing in detail the circuit construction of the tachometer of the invention.

Referring now to FIG. 5, the pressure sensor 32 includes a pressure sensing element 511 consisting for example of a known type of semiconductor pressure sensing element whose output voltage varies with pressure changes and thus the pressure sensing element 511 generates at its output a voltage signal as shown in (a) of FIG. 7 (in the case of a four-cylinder engine, for example, two pressure changes occur for every engine crankshaft revolution and two periods of the voltage signal represent one complete engine revolution). This signal is amplified by an amplifier 513 of the amplifier circuit 33 through a capacitor 512 and the signal shown in (b) of FIG. 7 appears at the output of the amplifier 513.

This signal is applied to the input portion of a multiplying element 514 of the multiplier circuit 34. In this embodiment, the multiplying element 514 is of the same type as the RCA COS/MOS CD4046A. A counter 515, a NAND gate 516, an inverter 517 and a D-type flip-flop 518 produce one signal pulse at the output Q of the D-type flip-flop 518 each time the number of pulses applied to the input of the counter 515 reaches 60. As a result, if the multiplying element 514 has its terminal VCO OUT connected to the input $\phi$ of the counter 515 and its terminal COMPARATOR IN connected to the output terminal Q of the D-type flip-flop 518 and if resistors 520, 521 and 522 and capacitors 523 and 524 are connected to the multiplying element 514, a frequency which is 60 times the frequency at the terminal SIGNAL IN is generated at the output terminal VCO OUT of the multiplying device 514. In other words, if the engine speed is 600 rpm, then a pulse signal of $(600 \times 2)/60 = 20$ Hz is applied to the terminal SIGNAL IN of the multiplying element 514 and a pulse signal of 1200 $(= 20 \times 60)$ Hz is generated at its output terminal VCO OUT.

On the other hand, the oscillator circuit 35 generates an oscillation pulse signal of a constant frequency and the pulses are counted by a counter 531 which in turn generates at its output terminal Qn a pulse signal of 10 Hz as shown in (c) of FIG. 7. This 10 Hz signal is applied to the input of a counter 532 which in turn generates the signals shown in (d), (e), (f) and (g) of FIG. 7 at its output terminals "9", "7", "8" and CARRY OUT. The operation of the counter 532 is the same as the RCA COS/MOS Decade Counter/Divider CD4017. The CARRY OUT signal is applied to one input of a NAND gate 538 whose other input receives the previously mentioned multiplication signal shown in (b) of FIG. 7. Thus, the NAND gate 538 is opened for a time interval $T_{05}$ corresponding to the five clock pulses shown in (c) of FIG. 7 $((1/10) \times 5 = 0.5$ sec in this embodiment) and thus the NAND gate 538 generates at its output the multiplication signal only during the time interval $T_{05}$ as shown in (i) of FIG. 7. In other words, if the engine speed is 600 rpm as mentioned previously, $1200 \times 0.5 = 600$ pulses will be present in the time interval $T_{05}$ since the multiplication signal has a frequency of 1200 Hz. In the case of this embodiment, as many pulses as the engine rpm will appear during the time interval $T_{05}$.

A resistor 552, a capacitor 550 and an inverter 541 are provided to reset the electric circuits to the initial states upon application of the supply voltage, so that only at the instant that the supply voltage is applied, a "1" signal is generated at the output of the inverter gate 541 and the counters 531, 532, etc., are reset to the initial states. As a result, the signal at the output $Q_1$ of a counter 533 changes from "0" to "1" at the expiration of one second after the application of the supply voltage and the signal is applied to its ENABLE terminal through an inverter gate 534, thus maintaining the output of the inverter gate 534 in the "0" signal state. The fact that the output signal of the inverter gate 534 goes to "1" only for one second after the application of the supply voltage, has the effect of preventing any erroneous display by the display unit 38 which will be described later. Also the output signal of the inverter gate 534 is applied to the data input of a D-type flip-flop 535 whose clock input receives the previously mentioned engine rpm signal (the amplifier output signal). The D-type flip-flop 535 and the following D-type flip-flop 536 are provided to determine whether the engine rpm signal has been generated so that if it is, a "1" signal is generated at the output Q of the flip-flop 536 and NAND gates 539 and 540 are opened. On the contrary, if no engine rpm signal is present, a "0" signal is generated at the output Q of the flip-flop 536 and the NAND gates 539 and 540 are closed. The purpose of this arrangement is to prevent any erroneous display when no engine rpm signal is present.

The above-described operation results in the generation at a terminal 501 of a pulse signal having a constant frequency (about 1 KHz in this embodiment), at a terminal 502 of a pulse signal superposed by an engine rpm signal as shown in (i) of FIG. 7, at a terminal 503 of a reset signal which goes to "1" at one-second intervals as shown in (d) of FIG. 7, at a terminal 504 of the storage signal shown in (e) of FIG. 7 and at a terminal 505 of a signal which goes to "1" only for one second after the application of the supply voltage. These signals are applied to the counter/decoder circuit 37 shown in FIG. 6.

Figure 6:
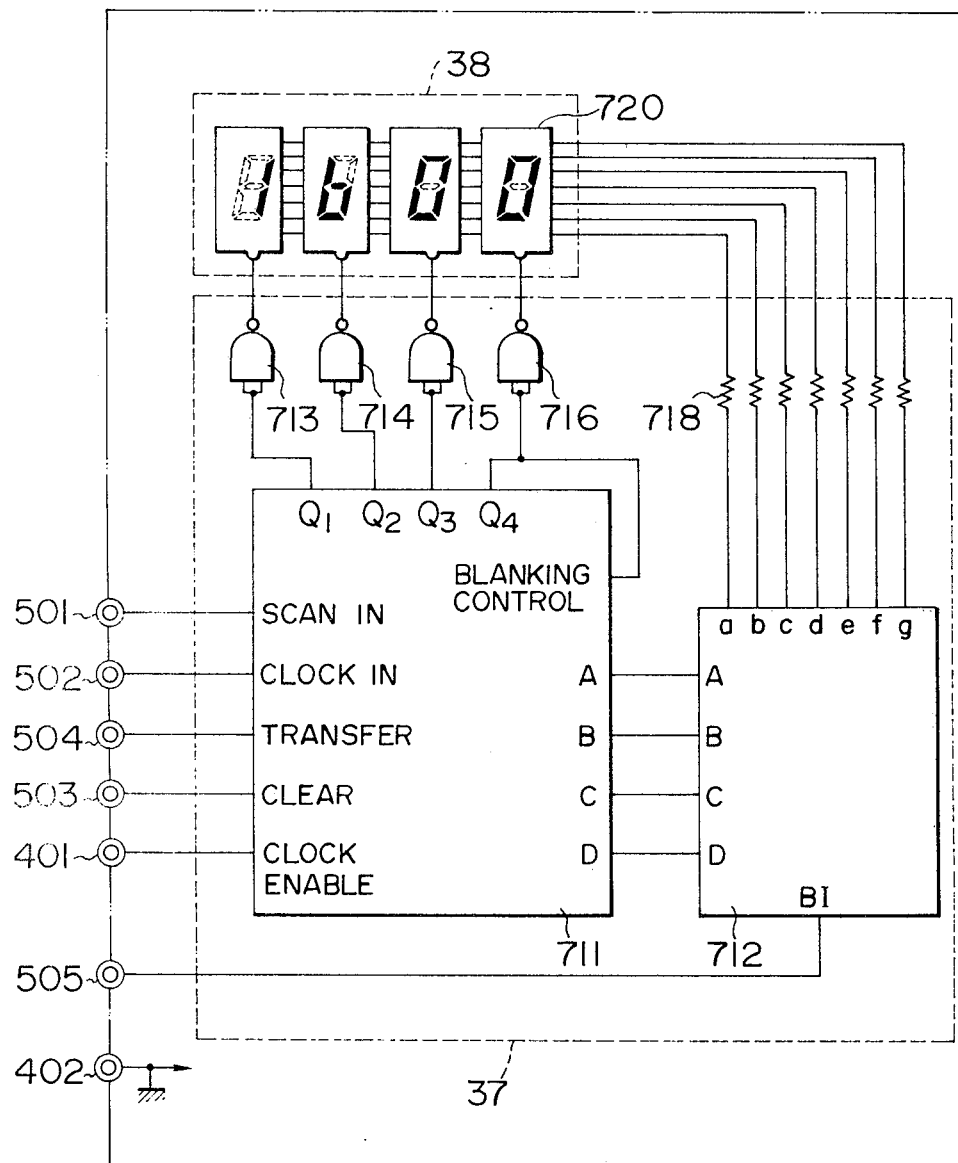

In FIG. 6, the terminals 401 and 402 are the positive and negative supply terminals. Although the terminals are shown not wired, they are connected to the associated electronic components. The counter/decoder circuit 37 includes a counter 711 which operates in the same manner as the Toshiba C²MOS TC 5051P 4-digit decade counter with blanking control; the counts for the respective digit positions are sequentially delivered to the BCD outputs in a dynamic manner beginning with the most-significant digit position.

Assuming now that the engine speed is 1600 rpm, the number of the engine rpm signal pulses shown in (i) of FIG. 7 and appearing at the terminal 502 amounts to 1600 pulses during the time interval $T_{05}$ as mentioned previously. In response to the SCAN IN input signal arriving at the terminal 501, the output $Q_1$ of the counter 711 first goes to "1" and thus "1", "0", "0" and "0" signals respectively appear at its BCD outputs A, B, C and D representing a decimal digit "1". When the output $Q_1$ goes to "0" and the output $Q_2$ goes to "1", "0", "1", "1" and "0" signals respectively appear at the outputs A, B, C and D representing a decimal digit "6". Then when the output $Q_3$ goes to "1", a "0" signal appears at each of the outputs A, B, C and D representing a digit "0", and when the output $Q_4$ goes to "1", a "0" signal appears at each of the outputs A, B, C and D representing a decimal digit "0". The output signals from the outputs $Q_1$, $Q_2$, $Q_3$ and $Q_4$ are respectively applied to NAND gates 713, 714, 715 and 716 each serving as a NOT gate and operated by a large drive current; the outputs of these NAND gates drive the display unit 38. The RCA CD40107B may be used satisfactorily for each of these NAND gates.

On the other hand, the BCD outputs are applied to the corresponding inputs of a decoder 712 (e.g., the Toshiba C²MOS TC 5022BP BCD-to-7-Segment Decoder/Driver) and a 7-segment display drive signal corresponding to the BCD input signal appears as its outputs a to g. Thus each of four 7-segment light-emitting displays 720 of the display unit 38 is lit by the corresponding segment signal, thus displaying a decimal number "1600" as shown in the Figure.

While, in the embodiment described above, the power supply is adapted to be connected to the battery installed in a vehicle by a lead wire, a dry cell or the like may be incorporated in the tachometer to thereby eliminate the use of any lead wire.

Further, while the tachometer according to the embodiment is adapted to be forced into and fixedly mounted on the oil filler port in the engine cylinder head cover by utilizing the resiliency of rubber, the invention is not intended to be limited thereto and the tachometer may be fixedly mounted by means of a screw or the like.

Further, while the engine rpm is computed by multiplying the signal generated by detecting pressure changes, a pulse signal having a high frequency (e.g., 1 MHz) may be superposed on the signal shown in (b) of FIG. 7 so as to count the number of pulses appearing during the "1" period.

We claim:

1. A tachometer suitable for use in engine maintenance, comprising:
   pressure sensing means for producing an electric signal representing the pressure changes within said engine;
   a member for supporting said pressure sensing means, said member being mountable at the oil filler port of said engine for providing communication between said pressure sensing means and the interior of said engine,
   means connected to said pressure sensing means for computing the rotational speed of said engine in accordance with said signal of said pressure sensing means; and
   display means responsive to said computing means for displaying the rotational speed of said engine, said display means being located within the engine compartment thereby facilitating said maintenance.

2. A tachometer according to claim 1, wherein said pressure sensing means includes a semiconductor pressure sensing element.

3. A tachometer according to claim 1, wherein said computing means includes:
   a multiplier circuit connected to said pressure sensing means for multiplying the frequency of the output signal of said pressure sensing means by a predetermined number;
   an oscillator circuit for producing block pulses of a constant frequency;
   a computing circuit connected to said multiplier circuit and said oscillator circuit, for counting said clock pulses to allow an output signal of said multiplier circuit to be outputted during a predetermined constant period; and
   a counter/decoder circuit connected to said computing circuit and said display means, for supplying to said display means an output signal representing the rotational speeds of said engine.

4. A tachometer according to claim 1, 2 or 3, wherein said engine is a Diesel engine.

5. A tachometer according to claim 1, wherein the support member has a portion made of an elastic material for engaging with the oil filler port.

6. A tachometer according to claim 1, wherein the display means displays digital numerical characters.

7. A tachometer according to claim 1 including a tachometer housing enclosing the pressure sensing means and the computing means, and wherein the display means is mounted on a slanting surface of an upper portion of said tachometer housing.

8. A tachometer suitable for use in maintenance of an engine, comprising:
   a tachometer housing mountable on a cylinder head cover of said engine with a fixing portion thereof insertable in an oil filler port;
   pressure sensing means arranged in said tachometer housing for producing an electric output signal representing pressure changes in said cylinder head cover;
   inlet pipe means disposed at said fixing portion of said tachometer housing for transferring the pressure changes in said cylinder head cover to said pressure sensing means;
   computing means arranged in said tachometer housing and connected to said pressure sensing means for computing rotational speeds of said engine in accordance with the output signal of said pressure sensing means; and
   display means arranged in said tachometer housing and connected to said computing means for displaying the rotational speeds of said engine in accordance with an output signal of said computing means.

* * * * *